US012613511B2

(12) United States Patent (10) Patent No.: US 12,613,511 B2
Lu et al. (45) Date of Patent: Apr. 28, 2026

(54) METHODS AND APPARATUSES FOR DATA PROCESSING, STORAGE MEDIUMS AND ELECTRONIC DEVICES

(71) Applicant: ZHEJIANG LAB, Hangzhou (CN)

(72) Inventors: Hongfei Lu, Hangzhou (CN); Xingyu Liu, Hangzhou (CN); Shaoyong Li, Hangzhou (CN); Wenjiao Yang, Hangzhou (CN); Xingming Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 342 days.

(21) Appl. No.: 18/041,397

(22) PCT Filed: Dec. 1, 2022

(86) PCT No.: PCT/CN2022/135798
§ 371 (c)(1),
(2) Date: Feb. 10, 2023

(87) PCT Pub. No.: WO2024/092944
PCT Pub. Date: May 10, 2024

(65) Prior Publication Data
US 2024/0264583 A1 Aug. 8, 2024

(30) Foreign Application Priority Data
Nov. 3, 2022 (CN) .......................... 202211366660.2

(51) Int. Cl.
*G05B 19/418* (2006.01)

(52) U.S. Cl.
CPC ................. *G05B 19/41835* (2013.01); *G05B 2219/31229* (2013.01)

(58) Field of Classification Search
CPC .... G05B 19/41835; G05B 2219/31229; G06F 16/27; G06F 3/0658; G06F 3/067;
(Continued)

(56) References Cited

U.S. PATENT DOCUMENTS 9,391,841 B2 * 7/2016 Pope ...................... H04L 41/083
2004/0002385 A1 * 1/2004 Nguyen .............. G07F 17/3223
463/42
(Continued)

FOREIGN PATENT DOCUMENTS

CN 108494676 A 9/2018
CN 110557657 A 12/2019
(Continued)

OTHER PUBLICATIONS

ISA State Intellectual Property Office of the People's Republic of China, International Search Report Issued in Application No. PCT/CN2022/135798, Jul. 28, 2023, WIPO, 6 pages. (Submitted with Machine Translation).

(Continued)

*Primary Examiner* — Christopher Biagini
(74) *Attorney, Agent, or Firm* — McCoy Russell LLP

(57) ABSTRACT

The present disclosure discloses a method and an apparatus for data processing, a storage medium and an electronic device, where for each second unit in the embodiments of the present disclosure, a plurality of communication links are provided between the first unit and the second unit. The first unit, in response to a data operation request, sends the data operation request to the second unit through the plurality of communication links between the first unit and the second unit. The second unit processes the target data to be processed according to the data operation instruction in the data operation request to obtain a processing result, and sends the processing result to the first unit via a plurality of communication links. The first unit executes a response strategy for the data operation request based on the processing result.

6 Claims, 3 Drawing Sheets

(58) Field of Classification Search
CPC ............. H04L 41/0668; H04L 63/0428; H04L
63/0876; H04L 63/107; H04L 67/1097;
H04L 67/12; H04L 67/14; H04W 12/08;
H04W 76/14; H04W 76/15; Y02D 10/00
See application file for complete search history.

(56) References Cited

U.S. PATENT DOCUMENTS

| | | | | |
|---|---|---|---|---|
| 2008/0013569 A1* | 1/2008 | Boren | ..................... | H04L 12/66 370/466 |
| 2009/0198348 A1* | 8/2009 | Murphy | ............ | H04L 12/40176 710/5 |
| 2015/0154136 A1* | 6/2015 | Markovic | ............... | G06F 21/44 710/317 |
| 2017/0083725 A1* | 3/2017 | Takahashi | ........... | H04L 63/0485 |
| 2019/0171186 A1* | 6/2019 | Rose | .................... | G06Q 10/063 |
| 2020/0033840 A1* | 1/2020 | Balasubramanian | .... | G05B 9/03 |
| 2022/0382704 A1* | 12/2022 | Lan | .................... | G06F 13/4072 |

FOREIGN PATENT DOCUMENTS

| | | |
|---|---|---|
| CN | 110826001 A | 2/2020 |
| CN | 112333768 A | 2/2021 |
| CN | 113133132 A | 7/2021 |
| CN | 113301096 A | 8/2021 |
| CN | 113312370 A | 8/2021 |
| CN | 113645208 A | 11/2021 |
| CN | 113645283 A | 11/2021 |
| CN | 113867128 A | 12/2021 |
| CN | 114064435 A | 2/2022 |
| CN | 114924999 A | 8/2022 |
| CN | 115268778 A | 11/2022 |
| WO | 2020215823 A1 | 10/2020 |

OTHER PUBLICATIONS

ISA State Intellectual Property Office of the People's Republic of China, Written Opinion of the International Searching Authority Issued in Application No. PCT/CN2022/135798, Jul. 28, 2023, WIPO, 6 pages. (Submitted with Machine Translation).
State Intellectual Property Office of the People's Republic of China, Office Action and Search Report Issued in Application No. 202211366660.2, Dec. 19, 2022, 12 pages. (Submitted with Machine/ Partial Translation).
State Intellectual Property Office of the People's Republic of China, Office Action and Search Report Issued in Application No. 202211366660.2, Jan. 12, 2023, 11 pages. (Submitted with Machine/ Partial Translation).

* cited by examiner

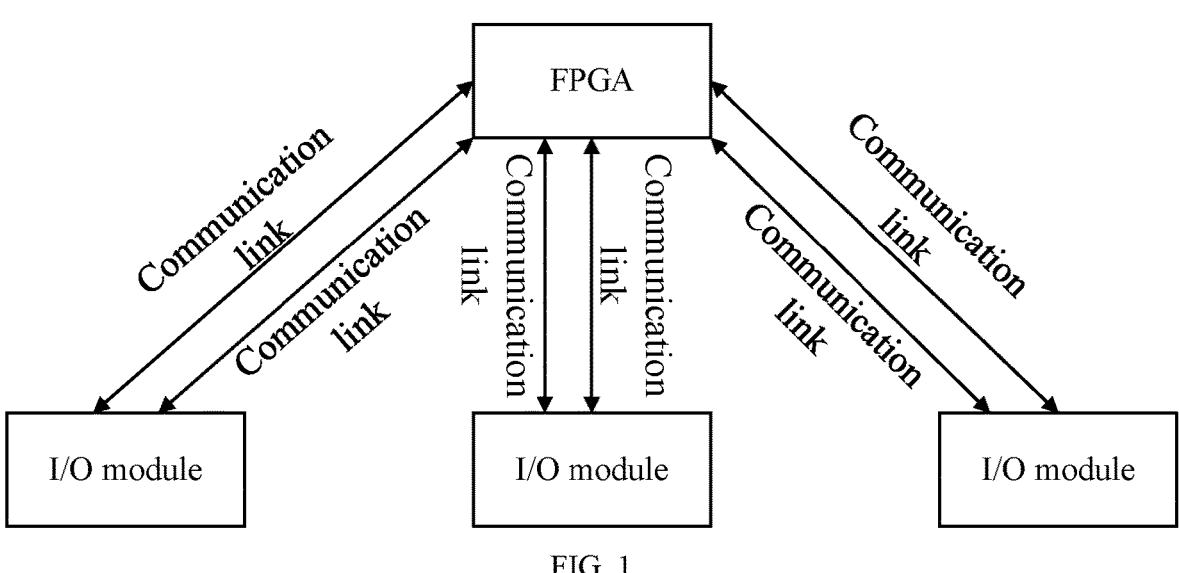

FIG. 1

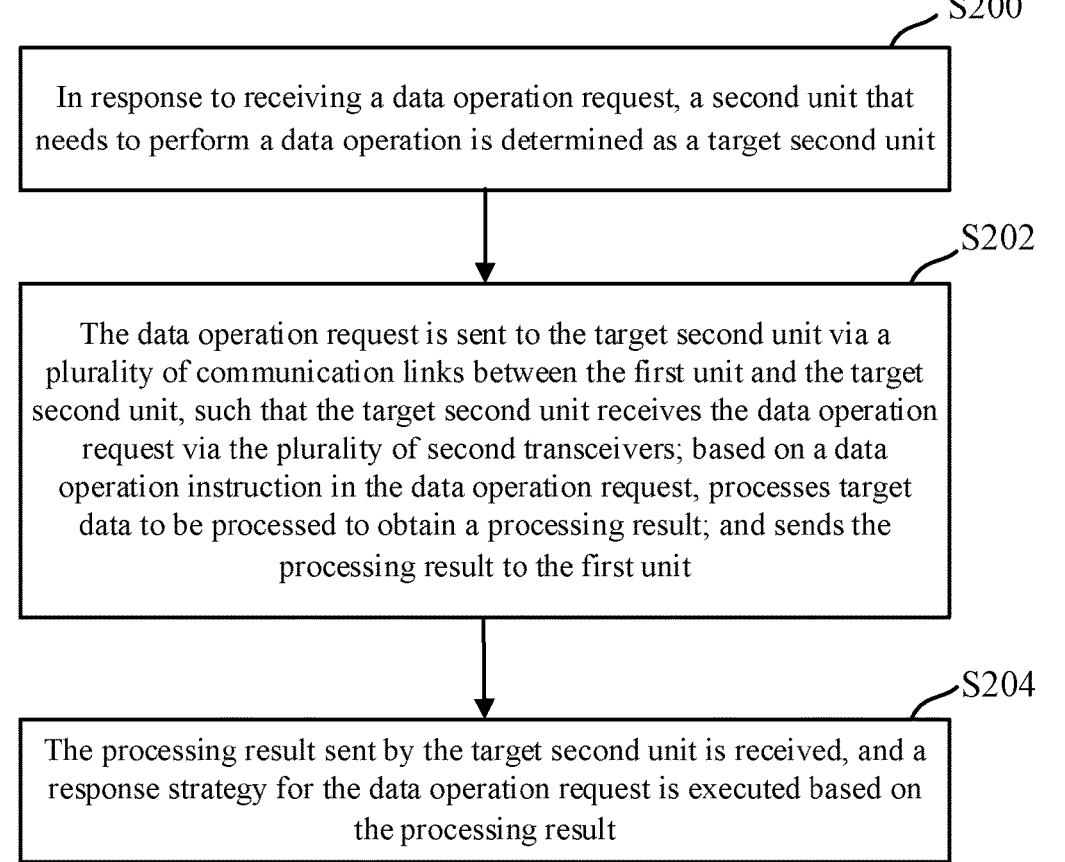

S200

In response to receiving a data operation request, a second unit that needs to perform a data operation is determined as a target second unit

S202

The data operation request is sent to the target second unit via a plurality of communication links between the first unit and the target second unit, such that the target second unit receives the data operation request via the plurality of second transceivers; based on a data operation instruction in the data operation request, processes target data to be processed to obtain a processing result; and sends the processing result to the first unit

S204

The processing result sent by the target second unit is received, and a response strategy for the data operation request is executed based on the processing result

FIG. 2

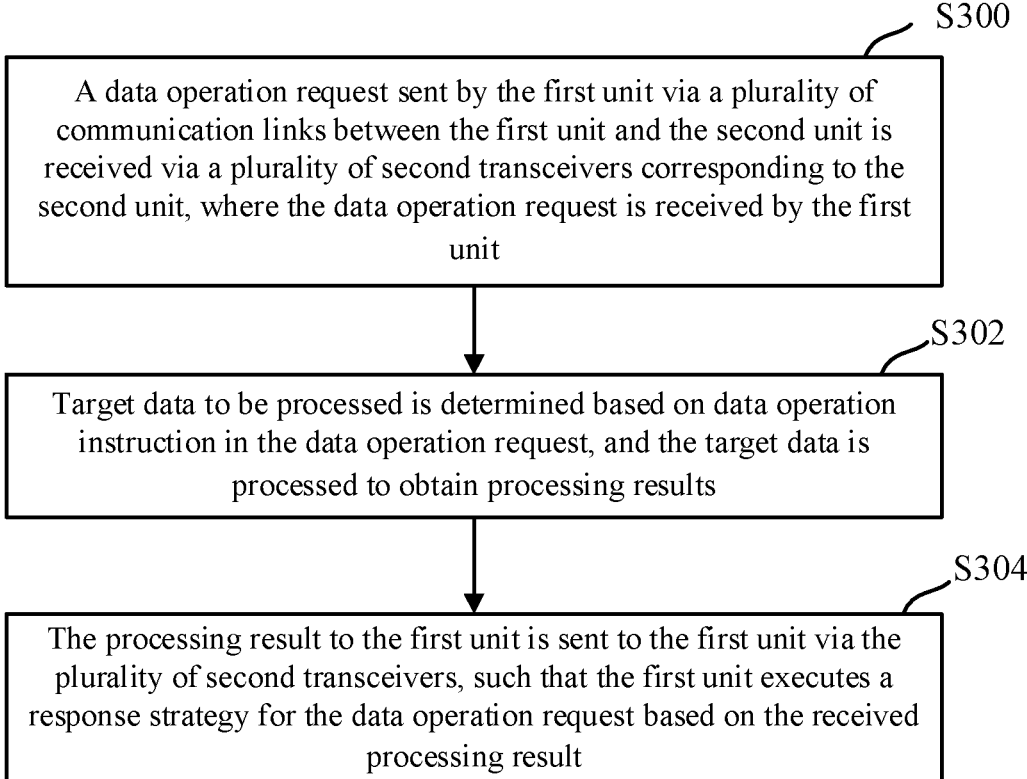

S300

A data operation request sent by the first unit via a plurality of communication links between the first unit and the second unit is received via a plurality of second transceivers corresponding to the second unit, where the data operation request is received by the first unit

S302

Target data to be processed is determined based on data operation instruction in the data operation request, and the target data is processed to obtain processing results

S304

The processing result to the first unit is sent to the first unit via the plurality of second transceivers, such that the first unit executes a response strategy for the data operation request based on the received processing result

FIG. 3

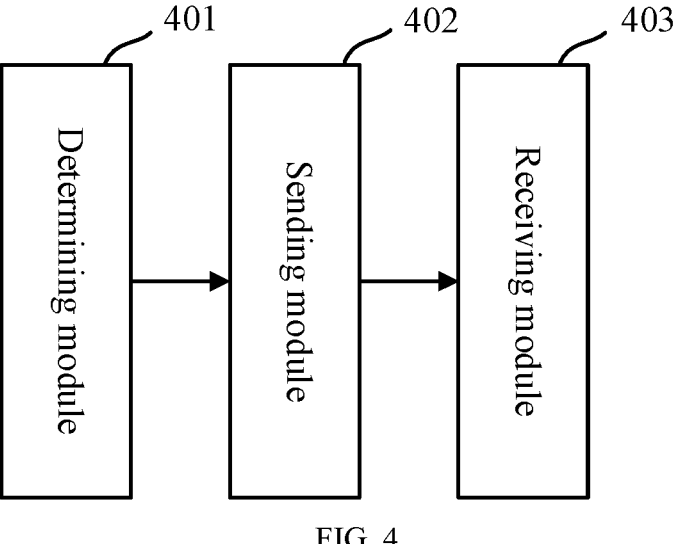

401          402          403

Determining module

Sending module

Receiving module

FIG. 4

METHODS AND APPARATUSES FOR DATA PROCESSING, STORAGE MEDIUMS AND ELECTRONIC DEVICES

CROSS REFERENCE TO RELATED APPLICATIONS

This application is a US National Phase of a PCT Application No. PCT/CN2022/135798 filed on Dec. 1, 2022, which claims priority to Chinese Patent Application No. 2022113666602 filed on Nov. 3, 2022, the entire contents of which are incorporated herein by reference in their entireties.

TECHNICAL FIELD

The present disclosure relates to the field of industrial control, and in particular to methods and apparatuses for data processing, storage mediums and electronic devices.

BACKGROUND

In the field of industrial control, an industrial control system may include a business process control system including various automation control components and process control components. The process control components can collect and monitor real-time data.

The automation control components in the industrial control system can include field programmable gate array (FPGA), and the process control components can include I/O (Input/Output) modules.

In related technologies, since the communication link between the FPGA and each I/O module is shared, when the shared communication link is abnormal, it may cause the failure of the data transmission between each I/O module and the FPGA.

SUMMARY

Embodiments of the present disclosure provide methods and apparatuses for data processing, storage mediums, and electronic devices to at least partially solve the problems in the related technologies.

In a first aspect, the present disclosure provides a method for data processing, where the method is applied to a first unit in an industrial control system, the industrial control system includes a plurality of first transceivers corresponding to the first unit, the industrial control system further includes a plurality of second units, for each of the second units, the industrial control system further includes a plurality of second transceivers corresponding to the second unit, a plurality of communication links are provided between the second unit and the first unit, for each of the communication links, the communication link is formed by connecting one of the plurality of second transceivers of the second unit to one of the plurality of the first transceivers of the first unit, and the method includes: in response to receiving a data operation request, determining a second unit that needs to perform a data operation as a target second unit; sending the data operation request to the target second unit via the plurality of the communication links between the first unit and the target second unit, such that the target second unit receives the data operation request via the plurality of the second transceivers, processes target data to be processed to obtain a processing result according to a data operation instruction in the data operation request, and sends the processing result to the first unit; and receiving the processing result sent by the target second unit, and executing a response strategy for the data operation request according to the processing result.

In some embodiments, receiving the processing result sent by the target second unit includes: determining, from the plurality of the first transceivers, first transceivers correspondingly connected to the target second unit as target first transceivers; switching transceiver states of the target first transceivers from data sending states to data receiving states; detecting, within a preset time period, whether each of the target first transceivers receives the processing result sent by the target second unit, where the preset time period is longer than a maximum execution duration of the target second unit for executing the data operation instruction; in response to detecting that each of the target first transceivers receives the processing result sent by the target second unit, executing a response strategy for the data operation request according to a first processing result received and deleting a processing result received after the first processing result is received; and switching the transceiver states of the target first transceivers from the data receiving states to the data sending states.

In some embodiments, the method further includes: in response to detecting that each of the target first transceivers does not receive the processing result sent by the target second unit, determining a timeout processing strategy for the data operation request and executing the timeout processing strategy.

In some embodiments, the plurality of the first transceivers and the plurality of the second transceivers are RS-485 transceivers.

In a second aspect, the present disclosure provides a method for data processing, where the method is applied to a second unit in an industrial control system, the industrial control system further includes a first unit, a plurality of first transceivers for the first unit and a plurality of second transceivers for the second unit, a plurality of communication links are provided between the second unit and the first unit, for each of the communication links, the communication link is formed by connecting one of the plurality of the second transceivers to one of the plurality of the first transceivers, and the method includes: receiving, via the plurality of the second transceivers, a data operation request sent by the first unit via the plurality of the communication links between the first unit and the second unit, where the data operation request is received by the first unit; determining, according to a data operation instruction in the data operation request, target data to be processed and processing the target data to obtain a processing result; and sending the processing result to the first unit via the plurality of the second transceivers, such that the first unit executes a response strategy for the data operation request according to the received processing result.

In some embodiments, the plurality of the second transceivers include: a primary second transceiver and an auxiliary second transceiver; receiving, via the plurality of the second transceivers, the data operation request sent by the first unit via the plurality of the communication links between the first unit and the second unit including: detecting whether the primary second transceiver receives the data operation request sent by the first unit via the plurality of the communication links between the first unit and the second unit; in response to detecting that the primary second transceiver receives the data operation request, storing the data operation request to a first buffer, parsing the data operation request to obtain a data operation instruction, and storing the data operation instruction to a first task queue; in response to detecting that the primary second transceiver does not receive the data operation request, detecting whether the auxiliary second transceiver receives the data operation request; and in response to detecting that the auxiliary second transceiver receives the data operation request, storing the data operation request to a second buffer, parsing the data operation request to obtain a data operation instruction, and storing the data operation instruction to a second task queue.

In some embodiments, determining, according to a data operation instruction in the data operation request, target data to be processed including: detecting whether the first task queue contains the data operation instruction, in response to detecting that the first task queue contains the data operation instruction, determining, according to the data operation instruction, the target data to be processed; and in response to detecting that the first task queue does not contain the data operation instruction, detecting whether the second task queue contains the data operation instruction, and in response to detecting that the second task queue contains the data operation instruction, determining, according to the data operation instruction, the target data to be processed.

In some embodiments, sending the processing result to the first unit via the plurality of the second transceivers including: switching transceiver states of the plurality of the second transceivers from data receiving states to data sending states; sending the processing result, via the plurality of the second transceivers, to the first unit; switching the transceiver states of the plurality of the second transceivers from the data sending states to the data receiving states.

In a third aspect, the present disclosure provides a computer readable storage medium, where the storage medium stores a computer program, the computer program achieves the method for data processing described above when executed by a processor.

In a fourth aspect, the present disclosure provides an electronic device including a memory, a processor and a computer program stored in the memory and runnable on the processor, where the processor, when the program is executed by the processor, achieves the method for data processing described above.

At least one of the above technical solutions according to embodiments of the present disclosure can achieve the following beneficial effect: for each second unit in the present disclosure embodiment, a plurality of communication links are provided between the first unit and that second unit. The first unit, in response to the data operation request, sends the data operation request to the second unit via the plurality of communication links between the first unit and the second unit. The second unit processes the target data to be processed according to the data operation instruction in the data operation request to obtain a processing result, and sends the processing result to the first unit via the plurality of communication links. The first unit executes a response strategy for the data operation request based on the processing result. In the method, end-to-end communication is performed between the first unit and each second unit, and multiple communication links exist between the first unit and each second unit to ensure proper communication between the first unit and the second unit and to improve the communication stability of the industrial control system.

BRIEF DESCRIPTION OF THE DRAWINGS

The accompanying drawings illustrated herein are used to provide further understanding of the present disclosure and form a part of the present disclosure. The exemplary embodiments and descriptions of the present disclosure are used to explain the present disclosure, and do not constitute an improper limitation of the present disclosure. In the accompanying drawings:

FIG. 1 is a schematic diagram of multiple communication links between a first unit and each second unit according to an embodiment of the present disclosure.

FIG. 2 is a schematic flowchart of a method for data processing according to an embodiment of the present disclosure.

FIG. 3 is a schematic flowchart of a method for data processing according to another embodiment of the present disclosure.

FIG. 4 is a schematic structure diagram of a data processing apparatus according to an embodiment of the present disclosure.

DETAILED DESCRIPTION OF THE EMBODIMENTS

Figure 5:
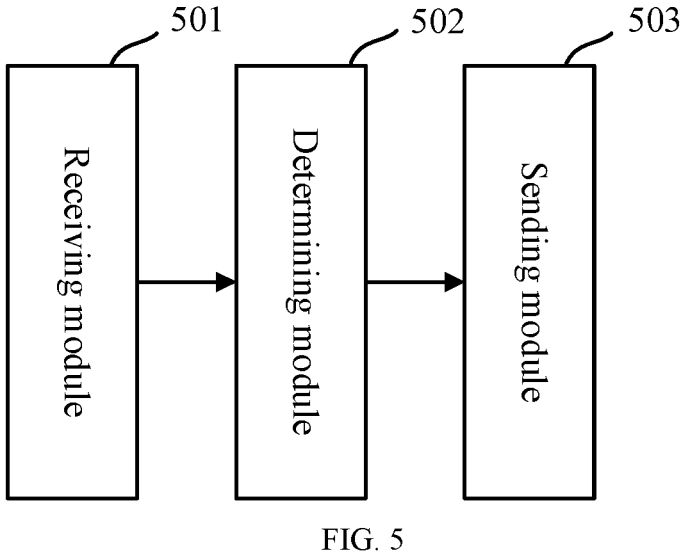
FIG. 5 is a schematic structure diagram of a data processing apparatus according to another embodiment of the present disclosure.

The data processing method provided in the present disclosure is intended to establish end-to-end communication between an FPGA and I/O modules in an industrial control system, and to establish multiple communication links between the FPGA and each I/O module so as to ensure the normal communication between the FPGA and the I/O modules in case of any the communication link failure.

In order to make the purposes, technical solutions and advantages of the present disclosure clearer, the technical solutions of the present disclosure will be clearly and completely described below in conjunction with specific embodiments and corresponding drawings of the present disclosure. The described embodiments are only a part of the embodiments of the present disclosure, and not all of them. Other embodiments achieved by those of ordinary skill in the art based on the embodiments in the present disclosure without paying inventive work shall all fall within the scope of protection of the present disclosure.

The technical solutions provided by the embodiments of the present disclosure are described in detail below in conjunction with the accompanying drawings.

Embodiments of the present disclosure provide a data processing system including: a first unit and second units of an industrial control system. The first unit, such as an FPGA, etc, may refer to a component of the industrial control system for controlling each second unit. A second unit, such as I/O modules, etc, may refer to a component of the industrial control system for monitoring and collecting data generated during an operation of various industrial equipment. In addition, the second unit can also configure the data required for the operation of each industrial equipment in the industrial control system. The data generated or required during the operation of each industrial equipment may include: input digital signal data, output digital signal data, input analog signal data, output analog signal data, etc. The data generated or required during the operation of each industrial equipment may include: voltage data, current data, temperature data, humidity data, etc.

In the industrial control system, a first unit can control a plurality of second units. In an embodiment of the present disclosure, the industrial control system includes a plurality of first transceivers for each first unit, and a plurality of second transceivers for each second unit. A first transceiver and a second transceiver have the same structure, and the first transceiver and the second transceiver may be RS-485 transceivers. When the first transceiver and the second transceiver are RS-485 transceivers, the communication protocol between the first unit and the second unit is RS-485 protocol. In addition, since the RS-485 transceiver adopts a half-duplex communication mode, the RS-485 transceiver cannot receive data and send data at the same time, so the RS-485 transceiver may need to switch the transceiver state when sending and receiving data.

For each second unit, there are a plurality of communication links between the second unit and the first unit, and for each communication link, the communication link is formed by connecting a second transceiver of the second unit and a first transceiver of the first unit. In this way, when there is a failure in the communication links between the first unit and any of the second units, the communications between the other second units and the first unit cannot be affected. In addition, for the communication links between each second unit and the first unit, when there is a failure in one communication link between the second unit and the first unit, other communication links can be used for communication to ensure that the second unit and the first unit can communicate normally, thereby improving the communication stability of the industrial control system.

Based on the above description of the communication links between the first unit and each second unit, an embodiment of the present disclosure provides a schematic diagram of multiple communication links between the first unit and each second unit, as shown in FIG. 1.

In FIG. 1, taking one FPGA and three I/O modules as an example, for each I/O module, there may be two communication links between the FPGA and the I/O module.

The communication process between a first unit and a second unit is described below.

The first unit may, in response to receiving a data operation request, determine a second unit that needs to perform a data operation as a target second unit. Then, the data operation request is sent to the target second unit via a plurality of communication links between the first unit and the target second unit, where the data operation request may include an identification of the second unit that needs to perform the data operation, a communication address of the second unit that needs to perform the data operation, and a data operation instruction. Alternatively, the data operation request may include: a data collection request, a data configuration request, etc.

Specifically, the first unit may, after receiving the data operation request, first determine from the data operation request the second unit that needs to perform the data operation as the target second unit; then, determine each first transceiver correspondingly connected to the target second unit from the plurality of first transceivers as each target first transceiver; after that, switch a transceiver state of each target first transceiver from a data receiving state to a data sending state; and finally, according to the communication address of the second unit and the communication protocol corresponding to multiple communication links between the first unit and the target second unit, send the data operation request to the target second unit. That is, the data operation request is sent to the target second unit via the communication links between the first unit and the target second unit. After sending the data operation request to the target second unit, the first unit may switch the transceiver state of each target first transceiver from the data sending state to the data receiving state.

The target second unit may receive the data operation request through the plurality of second transceivers; based on the data operation instruction in the data operation request, determine target data to be processed; process the target data to obtain the processing result; and send the processing result to the first unit. For different data operation requests or data operation instructions, the target data is processed in different ways and the corresponding processing results are different. For example, for a data collection request or a data collection instruction, target data can be collected and aggregated to obtain an aggregated data set (i.e., the processing result). For a data configuration request or a data configuration instruction, the target data is reconfigured to obtain reconfigured data, and configuration completion information is used as the processing result.

Specifically, the target second unit detects whether the plurality of second transceivers receive the data operation requests. If the plurality of second transceivers all receive the data operation request, the data operation instructions in the data operation requests are executed sequentially. If only a part of the plurality of second transceivers receive the data operation requests, only the data operation instructions in the data operation requests received by the part of the second transceivers are executed.

In some embodiments, the plurality of second transceivers of the target second unit may include: a primary second transceiver and an auxiliary second transceiver. In some embodiments, there may be a plurality of auxiliary second transceivers. A priority of the primary second transceiver is higher than a priority of the auxiliary second transceiver, and the primary second transceiver and the auxiliary second transceiver are mutually redundant second transceivers.

Further, the target second unit detects whether the primary second transceiver receives a data operation request sent by the first unit via a plurality of communication links between the first unit and the target second unit. If the primary second transceiver receives the data operation request, the data operation request is stored to a first buffer. If the primary second transceiver does not receive the data operation request, detects whether an auxiliary second transceiver receives the data operation request. If an auxiliary second transceiver receives the data operation request, the data operation request is stored to the second buffer. The first buffer is configured to buffer data received via the primary second transceiver and the second buffer is configured to buffer data received via the auxiliary second transceiver.

The target second unit detects whether the first buffer contains a data operation request; if the first buffer contains a data operation request, according to a communication protocol between the first unit and the target second unit, parses the data operation request to obtain a data operation instruction; and then, stores the data operation instruction to a first task queue; and if the first buffer does not contain a data operation request, detects whether the second buffer contains a data operation request; if the second buffer contains a data operation request, according to the communication protocol between the first unit and the target second unit, parses the data operation request to obtain the data operation instruction; and then, stores the data operation instruction to a second task queue. The first task queue and the second task queue may be ring queues for storing task instructions to be executed. The task instructions may refer to data operation instructions.

Further, the target second unit detects whether the first task queue contains the data operation instruction, and if the first task queue contains the data operation instruction, according to the data operation instruction, determines the target data to be processed; and then, processes the target data to obtain a processing result; and if the first task queue does not contain data operation instruction, detects whether the second task queue contains the data operation instruction; if the second task queue contains data operation instruction, according to the data operation instruction, determines the target data to be processed; and processes the target data to obtain the processing result.

Taking temperature data collection as an example, the first unit sends the data collection request to the target second unit via a plurality of communication links between the first unit and the target second unit. The target second unit determines the temperature data to be collected (i.e., the target data) based on the data collection instruction in the data collection request; then obtains and aggregates each temperature data to obtain a data set for the temperature data (i.e., the processing result); finally, sends the data set to the first unit.

After the processing result is obtained by the target second unit, the transceiver states of the plurality of second transceivers is switched from the data receiving states to the data sending states. Then, the processing results can be sent to the first unit separately via the plurality of second transceivers. After sending the processing result to the first unit, the target second unit may switch the transceiver states of the plurality of second transceivers from the data sending states to the data receiving states.

It should be noted that the target second unit needs to execute both the data operation instructions received by the primary second transceiver and the auxiliary second transceiver, i.e., successively execute the data operation instructions and successively send the generated processing results to the first unit. In this way, when any communication link between the first unit and the second unit fails, the second unit can send the processing result to the first unit.

After the target second unit sends the processing result to the first unit, the first unit can receive the processing result sent by the target second unit via each target first transceiver; based on the processing result, determine a response strategy for the data operation request; and execute the determined response strategy.

Specifically, after switching the transceiver state of each target first transceiver from the data sending state to the data receiving state, the first unit may, within a predetermined time period, detect whether the processing result sent by the target second unit is received by each target first transceiver. The preset time period is longer than a maximum execution duration for the target second unit to execute the data operation instruction.

If the first unit detects that each target first transceiver receives the processing result sent by the target second unit, the first unit may determine a response strategy for the data operation request based on the received first processing result, and execute the response strategy. At the same time, processing results received after the first processing result is received are deleted to reduce the buffer pressure of the first unit. The response strategies may include at least one of following strategies: forwarding the processing result to the device that sent the data operation request, returning the data operation completion information to the device that sent the data operation request, etc.

If the first unit detects that none of the processing results sent by the target second unit are received by each target first transceiver, the first unit may determine a timeout processing strategy for the data operation request; and execute the timeout processing strategy. The timeout processing strategies may include at least one of following strategies: resending the data operation request to the target second unit, returning a timeout alert information to the device that sent the data operation request, etc.

Alternatively, the transceiver state of each target first transceiver may be switched from a data receiving state to a data sending state after the processing result is received by the first unit.

Continuing with the above example, after the target second unit sends the data set to the first unit, the first unit, after receiving the data set, may forward the data set to the device that sent the data collection request.

It should be noted that for the first unit, the transceiver states of the plurality of first transceivers is the data sending states by default, and for the second unit, the transceiver states of the plurality of second transceivers is the data receiving states by default.

Based on the above description of the communication process between the first unit and the second unit, FIG. 2 is a schematic flowchart of a method for data processing according to an embodiment of the present disclosure, the data processing method is applied to the first unit in an industrial control system, the data processing method including:

S200: in response to receiving a data operation request, a second unit that needs to perform a data operation is determined as a target second unit.

S202: the data operation request is sent to the target second unit via a plurality of communication links between the first unit and the target second unit, such that the target second unit receives the data operation request via the plurality of second transceivers; based on a data operation instruction in the data operation request, processes target data to be processed to obtain a processing result; and sends the processing result to the first unit.

S204: the processing result sent by the target second unit is received, and a response strategy for the data operation request is executed based on the processing result.

In some embodiments of the present disclosure, the data processing method is applied to a first unit in an industrial control system, where the first unit is provided with a plurality of first transceivers correspondingly. The industrial control system further includes a plurality of second units, and for each second unit, the second unit is provided with a plurality of second transceivers, and there are a plurality of communication links between the second unit and the first unit, and for each communication link, the communication link is formed by connecting a second transceiver of the second unit and a first transceiver of the first unit.

When the first unit is in communication with the second unit, the first unit, in response to a data operation request, determines a second unit that needs to perform a data operation as a target second unit. Then, the first unit sends the data operation request to the target second unit via a plurality of communication links between the first unit and the target second unit, such that the target second unit receives the data operation request via the plurality of second transceivers; based on a data operation instruction in the data operation request, processes target data to be processed to obtain a processing result; and sends the processing result to the first unit.

The first unit receives the processing result sent by the target second unit, and based on the processing result, executes a response strategy for the data operation request.

When receiving the processing result, the first unit determines each first transceiver correspondingly connected to the target second unit from a plurality of first transceivers as each target first transceiver. The first unit switches the transceiver state of each target first transceiver from a data sending state to a data receiving state. Then, within a preset time period, the first unit detects whether each target first transceiver receives a processing result sent by the target second unit. The preset time period is longer than a maximum execution duration for the target second unit to execute the data operation instruction.

If the first unit detects that each target first transceiver receives a processing result sent by the target second unit, the first unit executes a response strategy for the data operation request based on the first processing result received, and deletes a processing result received after the first processing result is received. Finally, the first unit switches a transceiver state of each target first transceiver from a data receiving state to a data sending state.

If the first unit detects that none of the processing results sent by the target second unit are received by each target first transceiver, the first unit may determine a timeout processing strategy for the data operation request; and execute the timeout processing strategy.

Further, based on the above description of the communication process between the first unit and the second unit, FIG. 3 is a schematic flowchart of a method for data processing according to another embodiment of the present disclosure, the data processing method is applied to the second unit in an industrial control system, the data processing method including:

S300: a data operation request sent by the first unit via a plurality of communication links between the first unit and the second unit is received via a plurality of second transceivers corresponding to the second unit, where the data operation request is received by the first unit.

S302: target data to be processed is determined based on data operation instruction in the data operation request, and the target data is processed to obtain processing result.

S304: the processing result is sent to the first unit via the plurality of second transceivers, such that the first unit executes a response strategy for the data operation request based on the received processing result.

In the present disclosure embodiment, the data processing method is applied to any one of the second units in the industrial control system. The industrial control system further includes a first unit, and the first unit is correspondingly provided with a plurality of first transceivers. For each second unit, the second unit is provided with a plurality of second transceivers, and there are a plurality of communication links between the second unit and the first unit, and for each communication link, the communication link is formed by connecting a second transceiver of the second unit and a first transceiver of the first unit. In some embodiments, the plurality of second transceivers may include: a primary second transceiver and an auxiliary second transceiver.

It is noted that any one of the second units may correspond to the target second unit described above.

When the first unit is in communication with the second unit, the second unit may receive, via the plurality of second transceivers, a data operation request sent by the first unit via a plurality of communication links between the first unit and the second unit. The data operation request is received by the first unit.

The second unit may determine the target data to be processed based on the data operation instruction in the data operation request, and process the target data to obtain the processing result. The second unit, via a plurality of second transceivers, sends the processing result to the first unit such that the first unit executes a response strategy for the data operation request based on the received processing result.

When the second unit receives the data operation request, the second unit may detect whether the primary second transceiver receives the data operation request sent by the first unit via the plurality of communication links between the first unit and the second unit.

If the primary second transceiver receives a data operation request, the second unit stores the data operation request to a first buffer, parses the data operation request to obtain a data operation instruction, and stores the data operation instruction to a first task queue.

If the primary second transceiver does not receive the data operation request, the second unit detects whether an auxiliary second transceiver receives the data operation request.

If the auxiliary second transceiver receives a data operation request, the second unit stores the data operation request to a second buffer, parses the data operation request to obtain a data operation instruction, and stores the data operation instruction to a second task queue.

The second unit detects whether the first task queue contains a data operation instruction; if the first task queue contains a data operation instruction, determines the target data to be processed according to the data operation instruction; and processes the target data to obtain a processing result.

If the first task queue does not contain the data operation instruction, the second unit detects whether the second task queue contains the data operation instruction; if the second task queue contains the data operation instruction, the second unit determines the target data to be processed according to the data operation instruction, and processes the target data to obtain the processing result.

Finally, the second unit, via a plurality of second transceivers, sends the processing result to the first unit such that the first unit determines a response strategy for the data operation request based on the received processing result.

It should be noted that all actions to obtain signals, information or data in this application are carried out under the premise of complying with the corresponding data protection laws and policies of the country where the location is located, and with the authorization given by the corresponding device owner.

As can be seen by the method shown in FIGS. 2 and 3 above, for each second unit, there are multiple communication links between the first unit and the second unit. The first unit, in response to a data operation request, sends the data operation request to the second unit through the plurality of communication links between the first unit and the second unit. The second unit processes the target data to be processed according to the data operation instruction in the data operation request to obtain a processing result, and sends the processing result to the first unit via a plurality of communication links. The first unit executes a response strategy for the data operation request based on the processing result. In the method, end-to-end communication is performed between the first unit and each second unit, and multiple communication links exist between the first unit and each second unit to ensure proper communication between the first unit and the second unit and to improve the communication stability of the industrial control system.

The above provides the data processing method according to embodiments of the present disclosure, based on the same idea, the present disclosure further provides corresponding apparatuses, storage media and electronic devices.

FIG. 4 is a schematic structure diagram of a data processing apparatus according to an embodiment of the present disclosure, the apparatus including:

a determining module 401 configured to, in response to receiving a data operation request, determine a second unit that needs to perform a data operation as a target second unit;

a sending module 402 configured to send the data operation request to the target second unit via a plurality of communication links between the first unit and the target second unit, such that the target second unit receives the data operation request via the plurality of second transceivers; based on a data operation instruction in the data operation request, processes target data to be processed to obtain a processing result; and sends the processing result to the first unit; and a receiving module 403 configured to receive the processing result sent by the target second unit, and execute a response strategy for the data operation request based on the processing result.

In some embodiments, the receiving module 403 is further configured to determine, from the plurality of first transceivers, first transceivers correspondingly connected to the target second unit as target first transceivers; switch transceiver states of the target first transceivers from data sending states to data receiving states; detect, within a preset time period, whether each of the target first transceivers receives the processing result sent by the target second unit, where the preset time is longer than the maximum execution time for the target second unit to execute the data operation instruction; if the processing result sent by the target second unit is detected to be received by each of the target first transceivers in the target first transceiver, execute a response strategy for the data operation request based on the first processing result received; and delete the processing result received after the first processing result is received; switching the transceiver states of the target first transceivers from data receiving states to data sending states.

In some embodiments, the receiving module 403 is further configured to determine, if it is detected that the processing result sent by the target second unit is not received by each of the target first transceivers, a timeout processing strategy for the data operation request and execute the timeout processing strategy.

In some embodiments, the plurality of first transceivers and the plurality of second transceivers are RS-485 transceivers.

FIG. 5 is a schematic structure diagram of another data processing apparatus according to an embodiment of the present disclosure, the apparatus including:

a receiving module 501 configured to receive, via a plurality of second transceivers, a data operation request sent by the first unit via a plurality of communication links between the first unit and the second unit, where the data operation request is received by the first unit;

a determining module 502 configured to determine, according to the data operation instruction in the data operation request, target data to be processed; and process the target data to obtain a processing result;

a sending module 503 configured to send the processing result to the first unit, via the plurality of second transceivers, such that the first unit executes a response strategy for the data operation request according to the received processing result.

In some embodiments, the plurality of second transceivers includes: a primary second transceiver and an auxiliary second transceiver.

In some embodiments, the receiving module 501 is further configured to detect whether the primary second transceiver receives a data operation request sent by the first unit via a plurality of communication links between the first unit and the second unit; if the primary second transceiver receives the data operation request, store the data operation request to a first buffer, parse the data operation request to obtain data operation instruction, and store the data operation instruction to the first task queue; if the primary second transceiver does not receive the data operation request, detect whether the auxiliary second transceiver receives the data operation request; if the auxiliary second transceiver receives the data operation request, store the data operation request to the second buffer, parse the data operation request to obtain data operation instruction, and store the data operation instruction to a second task queue.

In some embodiments, the determination module 502 is further configured to detect whether the first task queue contains the data operation instruction; if the first task queue contains the data operation instruction, determine the target data to be processed based on the data operation instruction; if the first task queue does not contain the data operation instruction, detect whether the second task queue contains the data operation instruction; and if the second task queue contains the data operation instruction, determine, according to the data operation instruction, the target data to be processed.

In some embodiments, the sending module 503 is further configured to switch the transceiver states of the plurality of second transceivers from data receiving states to data sending states; send the processing result to the first unit, via the plurality of second transceivers; and switch the transceiver states of the plurality of second transceivers from data sending states to data receiving states.

The present disclosure further provides a computer readable storage medium, the storage medium storing a computer program, where the computer program is configured to, when executed by a processor, perform the data processing method provided in FIGS. 2 and 3 above.

Figure 6:
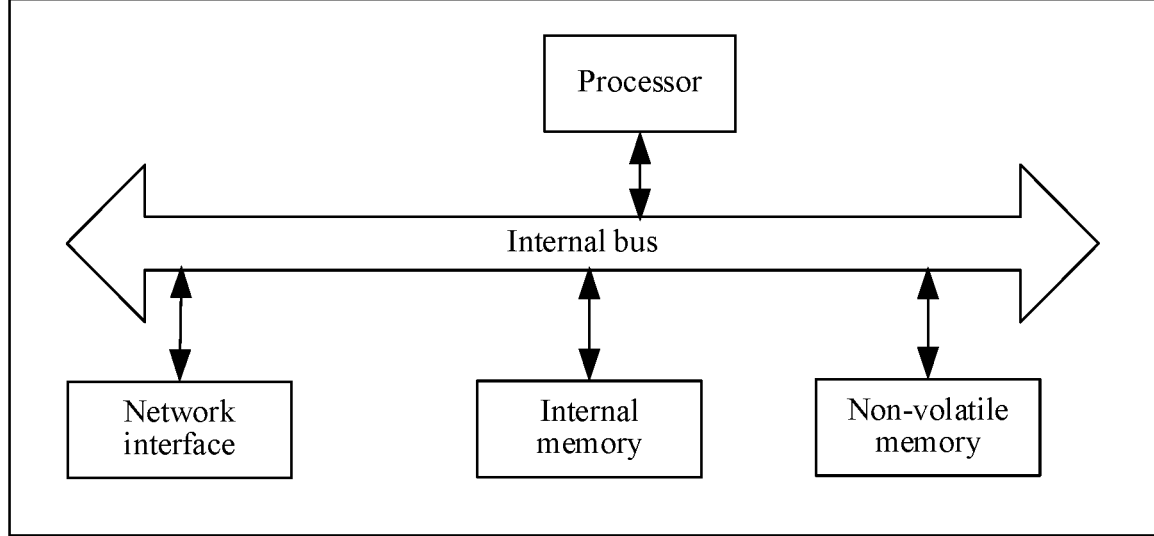
FIG. 6 is a schematic structure diagram of an electronic device according to an embodiment of the present disclosure.

Based on the data processing method shown in FIG. 2 and FIG. 3, embodiments of the present disclosure further provide a schematic structure diagram of an electronic device shown in FIG. 6. As shown in FIG. 6, at the hardware level, the electronic device includes a processor, an internal bus, a network interface, a memory, and a non-volatile memory, and may include hardware required for other operations. The processor reads the corresponding computer program from the non-volatile memory into the memory and then runs the computer program, to implement the method for data processing described in FIG. 3 and FIG. 2 above.

Of course, in addition to the software implementation, the present disclosure does not exclude other implementation methods, such as logic devices or a combination of hardware and software, etc. That is, the execution body of the following processing process is not limited to individual logic units, but can also be hardware or logic devices.

In the 1990s, it was clear that improvements to a technology could be distinguished between hardware improvements (e.g., improvements to circuit structures such as diodes, transistors, switches, etc.) and software improvements (improvements to a method flow). However, with the development of technology, currently, the improvements of many method flows can be regarded as the direct improvements of the hardware circuit structures. Designers almost always get the corresponding hardware circuit structure by programming the improved method flow into the hardware circuit. Therefore, it cannot be said that a method flow improvement cannot be implemented with a hardware physical module. For example, a Programmable Logic Device (PLD) (e.g., Field Programmable Gate Array (FPGA)) is one such integrated circuit whose logic function is determined by user programming of the device. A digital system is "integrated" on a PLD by the designer's own programming, without the need for a chip manufacturer to design and manufacture a dedicated integrated circuit chip. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the most commonly used is Very-High-Speed Integrated Circuit Hardware Description Language (VHDL) and Verilog. It should also be clear to those skilled in the art that a hardware circuit implementing the logical method flow can be easily obtained by simply programming the method flow with a little logic in one of the above hardware description languages and programming the method flow into the integrated circuit.

The controller can be implemented in any suitable manner, for example, the controller can take the form of, for example, a microprocessor or processor and a computer readable medium storing computer readable program code (e.g., software or firmware) executable by the (micro)processor, logic gates, switches, Application Specific Integrated Circuit (ASIC), programmable logic controllers and embedded microcontrollers. Examples of the controllers may include, but are not limited to, the following microcontrollers: ARC 625D, Atmel AT91SAM, Microchip PIC18F26K20, and Silicone Labs C8051F320, and memory controllers may also be implemented as part of the control logic of the memory. It is also known to those skilled in the art that, in addition to implementing the controller in a purely computer readable program code manner, it is entirely possible to make the controller perform the same function in the form of logic gates, switches, specialized integrated circuits, programmable logic controllers, embedded microcontrollers, etc. by logically programming the method steps. Thus such a controller can be considered as a hardware component, and the devices included therein for implementing various functions can also be considered as structures within the hardware component. Or even, the apparatus for implementing various functions can be considered as both a software module for implementing a method and a structure within a hardware component.

The systems, apparatuses, modules, or units elucidated in the above embodiments can be implemented specifically by a computer chip or entity, or by a product with certain functions. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above devices are divided into various units according to their functions and described respectively. It is, of course, possible to implement the functions of each unit in the same or multiple software and/or hardware when implementing the present disclosure.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

the present disclosure is described with reference to flowcharts and/or block diagrams of methods, devices (systems), and computer program products according to embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce a apparatus for implementing a function specified in one or more processes of the flowchart and/or one or more blocks of the block diagram.

These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may also be loaded onto a computer or other programmable data processing device such that a series of operational steps are executed on the computer or other programmable device to produce computer-implemented processing such that the instructions executed on the computer or other programmable device provide the steps used to perform the functions specified in one or more processes of the flowchart and/or one or more blocks of the block diagram.

In an exemplary configuration, the computing device includes one or more processors (CPUs), input/output interfaces, network interfaces, and memory.

Memory may include at least one of non-permanent storage in computer readable media, random access memory (RAM) or nonvolatile memory, such as read only memory (ROM) or flash RAM. Memory is an example of a computer readable medium.

Computer readable media include permanent and non-permanent, removable and non-removable media that can be implemented by any method or technology to store information. Information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read only memory (CDROM), digital versatile disc (DVD) or other optical storage, magnetic cartridge tape, magnetic tape magnetic disk storage, other magnetic storage device or any other non-transport medium that can be used to store information that can be accessed by a computing device. As defined herein, computer readable media does not include transitory computer readable media, such as modulated data signals and carriers.

It should also be noted that the term "include", "comprise" or any other variation thereof is intended to cover non-exclusive inclusion, such that a process, method, article, or device that includes a set of elements includes not only those elements, but also other elements that are not explicitly listed, or other elements that are inherent to such a process, method, commodity, or device. Without further limitation, the element defined by the statement "including a . . . " do not preclude the existence of additional identical elements in the process, method, article, or device that include the element.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects.

Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure may be described in the general context of computer-executable instructions executed by a computer, such as a program module. Generally, a program module includes routines, programs, objects, components, data structures, and the like that perform a specific task or implement a specific abstract data type. the present disclosure may also be practiced in distributed computing environments where tasks are performed by remote processing devices that are connected via a communication network. In distributed computing environments, program modules may be located in local and remote computer storage medium, including storage devices.

The various embodiments in the present disclosure are described in a progressive manner, and the same or similar parts between the various embodiments may be referred to each other, and each embodiment focuses on the differences from other embodiments. In particular, for a system embodiment, since it is basically similar to the method embodiment, the description is relatively simple, and for related parts, please refer to the partial description of the method embodiment.

The above description is only embodiments of the present disclosure and is not intended to limit the present disclosure. For those skilled in the art, various modifications and changes may be made in the present disclosure. Any modification, equivalent replacement, improvement, etc. made within the spirit and principle of the present disclosure shall be included in the scope of the claims of the present disclosure.

The invention claimed is:

1. A method for data processing, wherein the method is applied to a first unit in an industrial control system, the industrial control system comprises a plurality of first transceivers corresponding to the first unit, the industrial control system further comprises a plurality of second units, for each of the second units, the industrial control system further comprises a plurality of second transceivers corresponding to the second unit, a plurality of communication links are provided between the second unit and the first unit, for each of the communication links, the communication link is formed by connecting one of the plurality of second transceivers of the second unit to one of the plurality of the first transceivers of the first unit, and the method comprises:

receiving a data operation request;

determining a second unit that needs to perform a data operation as a target second unit;

sending the data operation request to the target second unit via the plurality of the communication links between the first unit and the target second unit, such that the target second unit receives the data operation request via the plurality of the second transceivers, processes target data to be processed to obtain a processing result according to a data operation instruction in the data operation request, and sends the processing result to the first unit;

receiving the processing result sent by the target second unit; and executing a response strategy for the data operation request according to the processing result;

wherein receiving the processing result sent by the target second unit comprises:

determining, from the plurality of the first transceivers, first transceivers correspondingly connected to the target second unit as target first transceivers;

switching transceiver states of the target first transceivers from data sending states to data receiving states;

detecting, within a preset time period, whether each of the target first transceivers receives the processing result sent by the target second unit, wherein the preset time period is longer than a maximum execution duration of the target second unit for executing the data operation instruction;

detecting that each of the target first transceivers receives the processing result sent by the target second unit, and executing a response strategy for the data operation request according to a first processing result received and deleting a processing result received after the first processing result is received; and switching the transceiver states of the target first transceivers from the data receiving states to the data sending states.

2. The method according to claim 1, wherein the plurality of the first transceivers and the plurality of the second transceivers are RS-485 transceivers.

3. A method for data processing, wherein the method is applied to a second unit in an industrial control system, the industrial control system further comprises a first unit, a plurality of first transceivers for the first unit and a plurality of second transceivers for the second unit, a plurality of communication links are provided between the second unit and the first unit, for each of the communication links, the communication link is formed by connecting one of the plurality of the second transceivers to one of the plurality of the first transceivers, and the method comprises:

receiving, by the plurality of the second transceivers, a data operation request sent by the first unit via the plurality of the communication links between the first unit and the second unit, wherein the data operation request is received by the first unit;

determining, according to a data operation instruction in the data operation request, target data to be processed and processing the target data to obtain a processing result; and sending the processing result to the first unit via the plurality of the second transceivers, such that the first unit executes a response strategy for the data operation request according to the received processing result;

wherein when executing a response strategy for the data operation request according to the received processing result, the first unit, detects that each of the target first transceivers receives the processing result sent by the target second unit, executes a response strategy for the data operation request according to a first processing result received and deletes a processing result received after the first processing result is received.

4. The method according to claim 3, wherein the plurality of the second transceivers comprise: a primary second transceiver and an auxiliary second transceiver; and receiving, by the plurality of the second transceivers, the data operation request sent by the first unit via the plurality of the communication links between the first unit and the second unit comprising:

detecting whether the primary second transceiver receives the data operation request sent by the first unit via the plurality of the communication links between the first unit and the second unit;

detecting that the primary second transceiver receives the data operation request, storing the data operation request to a first buffer, parsing the data operation request to obtain a data operation instruction, and storing the data operation instruction to a first task queue;

detecting that the primary second transceiver does not receive the data operation request, detecting whether the auxiliary second transceiver receives the data operation request; and detecting that the auxiliary second transceiver receives the data operation request, storing the data operation request to a second buffer, parsing the data operation request to obtain a data operation instruction, and storing the data operation instruction to a second task queue.

5. The method according to claim 4, wherein determining, according to a data operation instruction in the data operation request, target data to be processed comprising:

detecting whether the first task queue contains the data operation instruction;

detecting that the first task queue contains the data operation instruction, determining, according to the data operation instruction, the target data to be processed; and detecting that the first task queue does not contain the data operation instruction, detecting whether the second task queue contains the data operation instruction; and detecting that the second task queue contains the data operation instruction, determining, according to the data operation instruction, the target data to be processed.

6. The method according to claim 3, wherein sending the processing result to the first unit via the plurality of the second transceivers comprising:

switching transceiver states of the plurality of the second transceivers from data receiving states to data sending states;

sending the processing result, via the plurality of the second transceivers, to the first unit; and switching the transceiver states of the plurality of the second transceivers from the data sending states to the data receiving states.

* * * * *